US012101351B2

(12) United States Patent
Sani et al.

(10) Patent No.: US 12,101,351 B2
(45) Date of Patent: Sep. 24, 2024

(54) MALWARE PROTECTION

(71) Applicant: British Telecommunications Public Limited Company, London (GB)

(72) Inventors: Sadiq Sani, London (GB); Mordecai Ross, London (GB)

(73) Assignee: BRITISH TELECOMMUNICATIONS public limited company, London (GB)

(*) Notice: Subject to any disclaimer, the term of this patent is extended or adjusted under 35 U.S.C. 154(b) by 0 days.

(21) Appl. No.: 18/576,590

(22) PCT Filed: Jun. 29, 2022

(86) PCT No.: PCT/EP2022/067902
§ 371 (c)(1),
(2) Date: Jan. 4, 2024

(87) PCT Pub. No.: WO2023/280654
PCT Pub. Date: Jan. 12, 2023

(65) Prior Publication Data
US 2024/0259425 A1 Aug. 1, 2024

(30) Foreign Application Priority Data
Jul. 6, 2021 (GB) .................................... 2109760

(51) Int. Cl.
*H04L 9/40* (2022.01)
*G06F 21/56* (2013.01)
*H04L 61/4511* (2022.01)
(52) U.S. Cl.
CPC .......... *H04L 63/1466* (2013.01); *G06F 21/56* (2013.01); *H04L 61/4511* (2022.05)
(58) Field of Classification Search
CPC ... H04L 63/1466; H04L 61/4511; G06F 21/56
See application file for complete search history.

(56) References Cited

U.S. PATENT DOCUMENTS 11,843,622 B1 * 12/2023 Tellez ................. H04L 63/1425
2013/0191915 A1 * 7/2013 Antonakakis ......... G06F 21/566
726/23

(Continued)

FOREIGN PATENT DOCUMENTS

CN 105897714 A 8/2016
CN 106375345 A 2/2017

(Continued)

OTHER PUBLICATIONS

Kumar, Subham; Bhatia, Ashutosh; "Detecting Domain Generation Algorithms to prevent DDoS attacks using Deep Learning," IEEE International Conference on Advanced Networks and Telecommunications Systems (ANTS), Goa, India, 2019, 4 pages.*

(Continued)

*Primary Examiner* — Victor Lesniewski
(74) *Attorney, Agent, or Firm* — Nixon & Vanderhye P.C.

(57) ABSTRACT

Malware Protection A computer implemented method, computer system and computer program are provided for protecting against malware. The method trains a classifier to classify a domain name as being either legitimate or illegitimate, wherein a classification of illegitimate indicates that the domain name was generated by a Domain Generation Algorithm used to generate domain names for malware. The method retrains the classifier using an active learning technique by: using the classifier to determine a respective classification of each domain name in a set of domain names: performing a respective domain name system. DNS, query for each domain name in the set: labelling one or more domain names in the set based on the classification of those domain names and the outcome of the respective DNS queries for those domain names: and using training data comprising the labelled one or more domain names to retrain the classifier. The method uses the classifier to classify a domain name that is the subject of a DNS query from a (Continued)

computer system in a network. The method takes one or more predetermined actions for mitigating or preventing the activity of the malware in response to the domain name being classified as illegitimate.

15 Claims, 3 Drawing Sheets

(56) References Cited

U.S. PATENT DOCUMENTS

| | | | | |
|---|---|---|---|---|
| 2015/0264070 | A1* | 9/2015 | Harlacher | H04L 63/1408 |
| | | | | 726/23 |
| 2016/0337391 | A1 | 11/2016 | Mckinney | |
| 2017/0026390 | A1 | 1/2017 | Sofka et al. | |
| 2018/0077117 | A1* | 3/2018 | Hagen | H04L 63/0236 |
| 2018/0288086 | A1* | 10/2018 | Amiri | G06N 3/08 |
| 2018/0351972 | A1 | 12/2018 | Yu et al. | |
| 2019/0281079 | A1* | 9/2019 | Xu | H04L 67/5682 |
| 2019/0387005 | A1* | 12/2019 | Zawoad | H04L 61/4511 |
| 2020/0045077 | A1* | 2/2020 | Chiba | H04L 63/1466 |
| 2020/0059451 | A1* | 2/2020 | Huang | G06N 3/044 |
| 2020/0169570 | A1 | 5/2020 | Kleymenov | |
| 2020/0351244 | A1* | 11/2020 | Moore | H04L 61/4511 |
| 2021/0258279 | A1* | 8/2021 | Kugler Viegas | G06N 20/00 |
| 2021/0377303 | A1* | 12/2021 | Bui | G06F 40/14 |
| 2022/0417261 | A1* | 12/2022 | Rashidi | G06F 16/245 |

FOREIGN PATENT DOCUMENTS

| | | |
|---|---|---|
| CN | 110766165 A | 2/2020 |
| CN | 110830490 A | 2/2020 |
| CN | 112104765 A | 12/2020 |

OTHER PUBLICATIONS

Li, Yi; Xiong, Kaiqi; Chin, Tommy; Hu, Chengbin; "A Machine Learning Framework for Domain Generation Algorithm-Based Malware Detection," IEEE Access, vol. 7, pp. 32765-32782, 2019.*
International Preliminary Report on Patentability and Written Opinion of the International Searching Authority mailed Jan. 18, 2024, issued for International Application No. PCT/EP2022/067902 (9 pages).
Naoki Fukushi et al., "Exploration into Gray Area: Efficient Labeling for Malicious Domain Name Detection", 2019 IEEE 43rd Annual Computer Software and Applications Conference (COMPSAC), 2019, p. 770-775.
Doyen Sahoo et al., "Malicious URL Detection using Machine Learning: A Survey", https://doi.org/10.1145/nnnnnnn.nnnnnnn, Published Aug. 2019, vol. 1, No. 1, 37 pages.
International Search Report and Written Opinion of the ISA for PCT/EP2022/067902 mailed Oct. 25, 2022, 15 pages.
Great Britain Search Report for GB2109760.5 dated Mar. 31, 2022, 4 pages.
Examination Report for GB2109760.5 dated Sep. 8, 2023, 2 pages.

* cited by examiner

MALWARE PROTECTION

CROSS-REFERENCE TO RELATED APPLICATIONS

This application is the U.S. national phase of International Application No. PCT/EP2022/067902 filed Jun. 29, 2022, which designated the U.S. and claims priority to GB 2109760.5 filed Jul. 6, 2021, the entire contents of each of which are hereby incorporated by reference.

FIELD OF THE INVENTION

The present invention relates to protecting against malware. In particular, the present invention relates to the detection of domain names that have been generated by a domain generating algorithm (DGA) used by malware.

BACKGROUND TO THE INVENTION

Malware (or malicious software) is software which is designed to negatively impact a computer system or network. Once successfully infiltrated into a computer system or network, there are a wide range of functions that malware may carry out in order to achieve the aims of the attacker that deployed the malware. These functions may include functions such as, modifying the systems behaviour, monitoring a user's behaviour and exfiltration of sensitive data, and carrying out denial-of-service attacks (including, for example, ransomware attacks which encrypt a user's data and demand a payment in return for the encryption). Of course, there are many other functions that malware may carry out on behalf of an attacker, as will be appreciated by the skilled person.

Modern malware is typically designed to provide an attacker with ongoing control over the malware's activities thereby allowing the attacker to change the malware's operation to suit their changing aims (for example, by instructing it to carry out a distributed denial of service (DDOS) attack on a particular computer system or network). In order to achieve this the malware needs to contact a so-called command and control (or C&C) server to receive the attacker's instructions. Historically, an address for the command and control server was fixed and hard-coded into the malware. However, the use of a fixed location for the command and control server provided security researchers and law-enforcement with a way of interrupting the malware's operation—specifically by identifying the location of the command and control server and taking it down (or otherwise preventing communication with that location). This would prevent any new instructions being provided to the malware. Accordingly, in an effort to prevent this, malware authors have increasingly turned to using domain generating algorithms (DGAs) to specify locations at which a malware can contact its command & control server in a more dynamic way.

A DGA is a program that can generate new domain names in a deterministic manner. This means that both the malware and the attacker can use the DGA to independently generate the same list of domain names. Therefore, even if an existing location for a malware's command and control server is compromised, the attacker can re-locate the command and control server to a new location (i.e. domain name) generated using the DGA in the knowledge that the malware will eventually be able to re-connect to the command and control server by searching through the domains that it independently generates using the same DGA. Of course, in some cases the attacker may choose to periodically or sporadically re-locate the command and control server even in the absence of it being taken down to make the job of security researchers and law-enforcement more difficult. Typically, the DGAs used by malware comprise a time-dependent element, meaning that the list of domain names that are generated will change over time. Furthermore, in order to ensure reliable communication between the malware and the command and control server, it is common for DGAs to generate a large number of potential domain names at which the command and control server could be located. This means that the attacker has a choice of a large number of locations to deploy (or re-deploy) the command and control server to, such that it is likely that at least one location will be available for the attacker's use. That is to say, it is unlikely that all (or even most) of the potential locations for the command and control server will be exhausted, either unintentionally via pre-existing domain name registrations or through the intentional actions of security researchers or law-enforcement.

SUMMARY OF THE INVENTION

Accordingly, it would be beneficial to provide a technique for detecting domain names that have been generated by a DGA used by malware in order to allow action to be taken to mitigate or prevent the activity of the malware.

The present invention accordingly provides, in a first aspect, a computer implemented method for protecting against malware, the method comprising: training a classifier to classify a domain name as being either legitimate or illegitimate, wherein a classification of illegitimate indicates that the domain name was generated by a Domain Generation Algorithm used to generate domain names for malware; retraining the classifier using an active learning technique by: using the classifier to determine a respective classification of each domain name in a set of domain names; performing a respective domain name system, DNS, query for each domain name in the set; labelling one or more domain names in the set based on the classification of those domain names and the outcome of the respective DNS queries for those domain names; and using training data comprising the labelled one or more domain names to retrain the classifier; using the classifier to classify a domain name that is the subject of a DNS query from a computer system in a network; and taking one or more predetermined actions for mitigating or preventing the activity of the malware in response to the domain name being classified as illegitimate.

Labelling the one or more domain names may comprise labelling as legitimate each domain name in the set that was classified as legitimate and for which the DNS query succeeded.

Labelling the one or more domain names may comprise labelling as illegitimate each domain name in the set that was classified as illegitimate and for which the DNS query failed.

Labelling the one or more domain names may comprise: identifying any domain names in the set that were classified as legitimate and for which the DNS query failed; and obtaining a label for the identified domain names from an oracle.

Labelling the one or more domain names may comprise: identifying any domain names in the set that were classified as illegitimate and for which the DNS query succeeded; and obtaining a label for the identified domain names from an oracle.

Labelling the one or more domain names may comprise: obtaining additional information for at least one domain name in the set. The labelling of the at least one domain name may be further based on the additional information. Additional information may be obtained for each of the domain names in the set that were classified as legitimate and for which the DNS query succeeded. The additional information may comprise a Start of Authority, SOA, record included in a response to the DNS query. A domain name may be labelled as illegitimate in response to the SOA record for that domain name being empty.

The method may be performed by the computer system. Alternatively, the method may be performed within the network.

The one or more predetermined actions may comprise one or more, or all, of: causing a malware scan to be performed in respect of the computer system; increasing a level of monitoring that is performed in respect of the computer system; preventing communication with the domain name; flagging the domain name for review; and logging the access to the domain name.

The set of domain names may be selected from a larger set of domain names.

The present invention accordingly provides, in a second aspect, a computer system comprising a processor and a memory storing computer program code for performing the method set out above.

The present invention accordingly provides, in a third aspect, a computer program which, when executed by one or more processors, is arranged to carry out the method set out above.

BRIEF DESCRIPTION OF THE FIGURES

Embodiments of the present invention will now be described by way of example only, with reference to the accompanying drawings, in which.

DETAILED DESCRIPTION OF EMBODIMENTS

Figure 1:
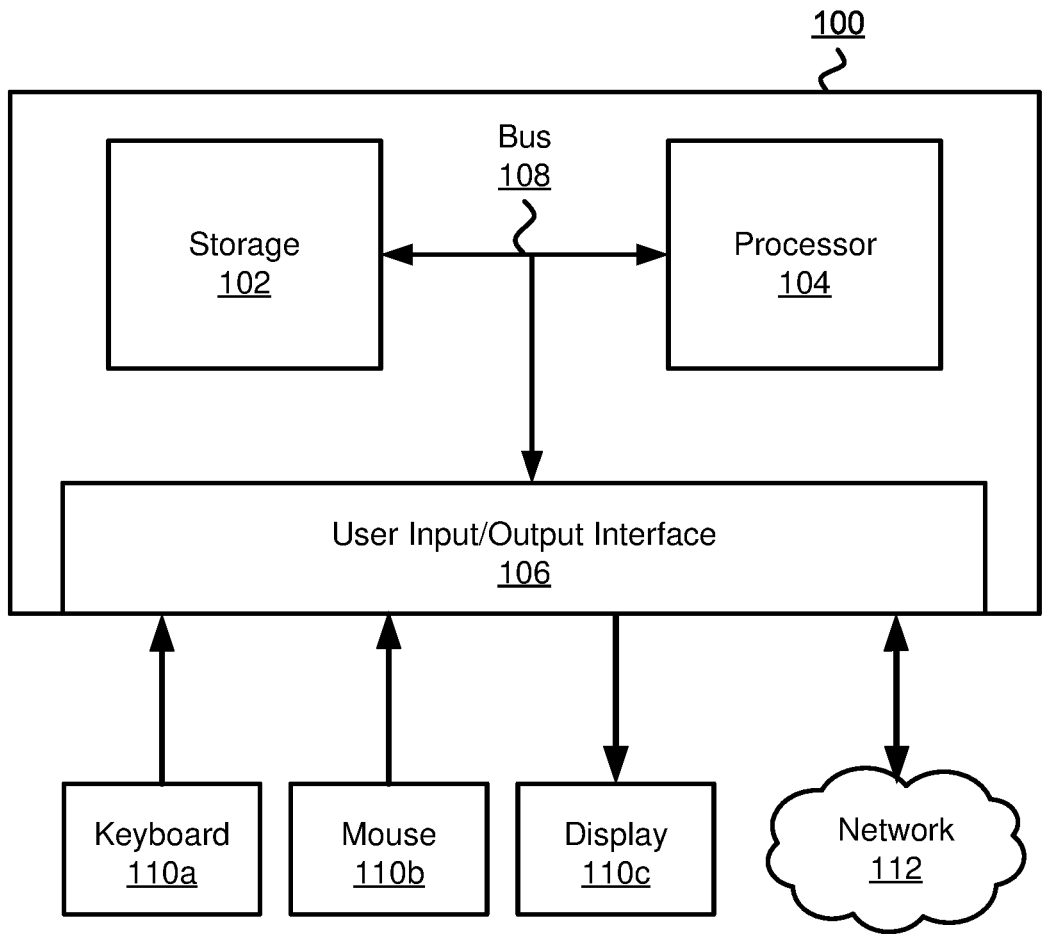
FIG. 1 is a block diagram of a computer system suitable for the operation of embodiments of the present invention.

FIG. 1 is a block diagram of a computer system 100 suitable for the operation of embodiments of the present invention. The system 100 comprises: a storage 102, a processor 104 and an input/output (I/O) interface 106, which are all communicatively linked over one or more communication buses 108.

The storage (or storage medium or memory) 102 can be any volatile read/write storage device such as a random access memory (RAM) or a non-volatile storage device such as a hard disk drive, magnetic disc, optical disc, ROM and so on. The storage 102 can be formed as a hierarchy of a plurality of different storage devices, including both volatile and non-volatile storage devices, with the different storage devices in the hierarchy providing differing capacities and response times, as is well known in the art.

The processor 104 may be any processing unit, such as a central processing unit (CPU), which is suitable for executing one or more computer programs (or software or instructions or code). These computer programs may be stored in the storage 102. During operation of the system, the computer programs may be provided from the storage 102 to the processor 104 via the one or more buses 108 for execution. One or more of the stored computer programs, when executed by the processor 104, cause the processor 104 to carry out a method according to an embodiment of the invention, as discussed below (and accordingly configure the system 100 to be a system 100 according to an embodiment of the invention).

The input/output (I/O) interface 106 provides interfaces to devices 110 for the input or output of data, or for both the input and output of data. The devices 110 may include user input interfaces, such as a keyboard 110a or mouse 110b as well as user output interfaces such as a display 110c. Other devices, such a touch screen monitor (not shown) may provide means for both inputting and outputting data. The input/output (I/O) interface 106 may additionally or alternatively enable the computer system 100 to communicate with other computer systems via one or more networks 112. It will be appreciated that there are many different types of I/O interface that may be used with computer system 100 and that, in some cases, computer system 100 may include more than one I/O interface. Furthermore, there are many different types of device 100 that may be used with computer system 100. The devices 110 that interface with the computer system 100 may vary considerably depending on the nature of the computer system 100 and may include devices not explicitly mentioned above, as would be apparent to the skilled person. For example, in some cases, computer system 100 may be a server without any connected user input/output devices. Such a server may receive data via a network 112, carry out processing according to the received data and provide the results of the processing via a network 112.

It will be appreciated that the architecture of the system 100 illustrated in FIG. 1 and described above is merely exemplary and that other computer systems 100 with different architectures (such as those having fewer components, additional components and/or alternative components to those shown in FIG. 1) may be used in embodiments of the invention. As examples, the computer system 100 could comprise one or more of: a personal computer; a laptop; a tablet; a mobile telephone (or smartphone); a television set (or set top box); a games console; an augmented/virtual reality headset; a server; or indeed any other computing device with sufficient computing resources to carry out a method according to embodiments of this invention.

Figure 2:
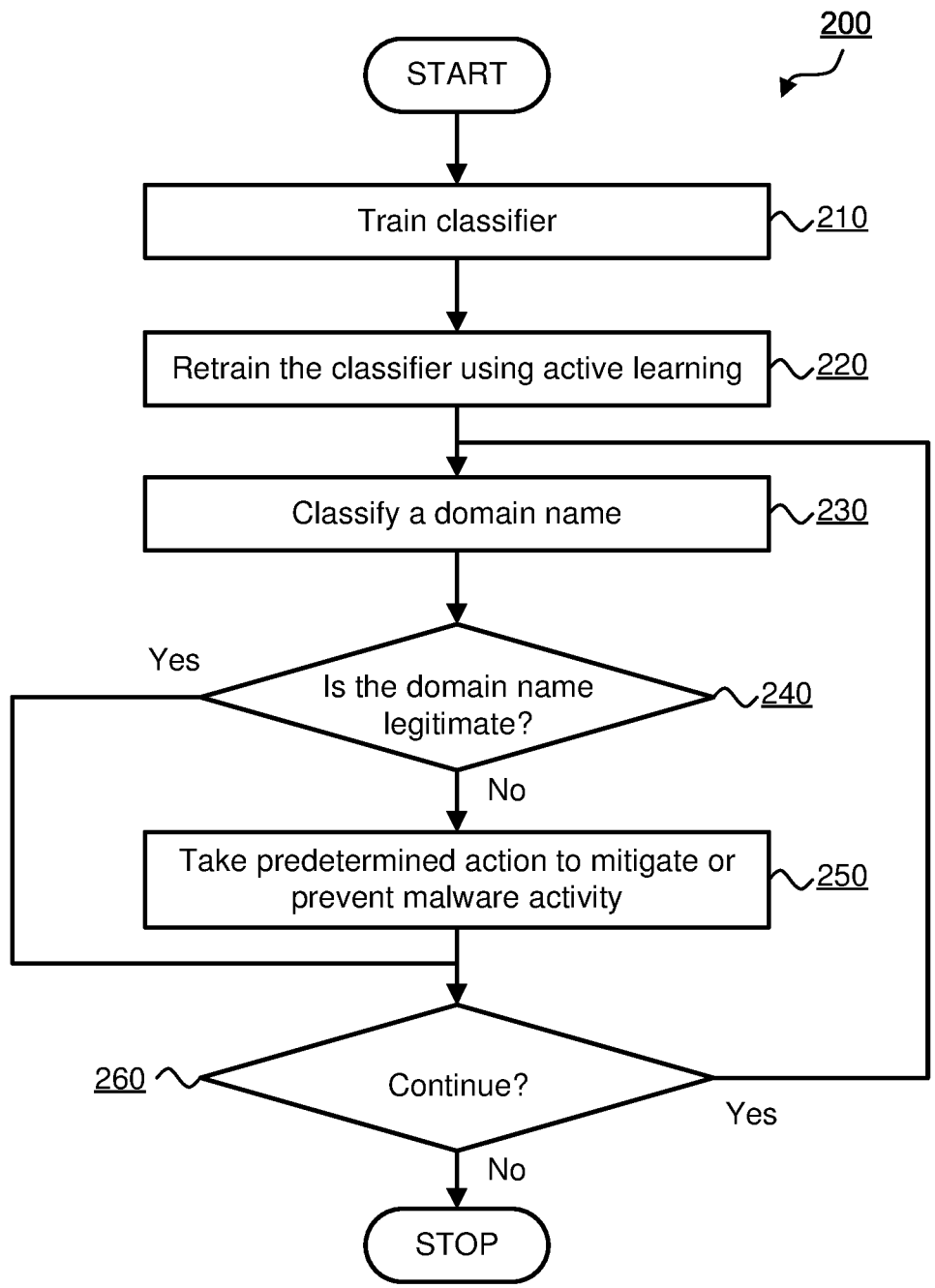
FIG. 2 is a flowchart illustrating a method for protecting against malware according to embodiments of the invention.

FIG. 2 is a flowchart illustrating a method 200 for protecting against malware according to embodiments of the invention, such as may be performed by computer system 100.

At an operation 210, the method 200 trains a classifier to classify a domain name as being either legitimate or illegitimate. The classifier is trained to classify a domain name as being illegitimate when it is determined that the domain name was generated by a Domain Generation Algorithm (DGA) used to generate domain names for malware (that is to say, where the domain name follows the same pattern of domain names as generated by a DGA used by malware). Conversely, the classifier is trained to classify a domain name as legitimate when it is determined that the domain name was not generated by a DGA used to generate domain names for malware (that is to say, where the domain name does not follow the same pattern of domain names as generated by a DGA used by malware). This initial training can be performed using an initial set of labelled training data using any appropriate machine learning technique and serves to create a classifier which is able to classify domain names to some minimal level of accuracy. The classifier produced by this initial training forms the starting point which will be further refined by later operations in method 200. Having created the classifier, the method 200 proceeds to an operation 220.

Figure 3:
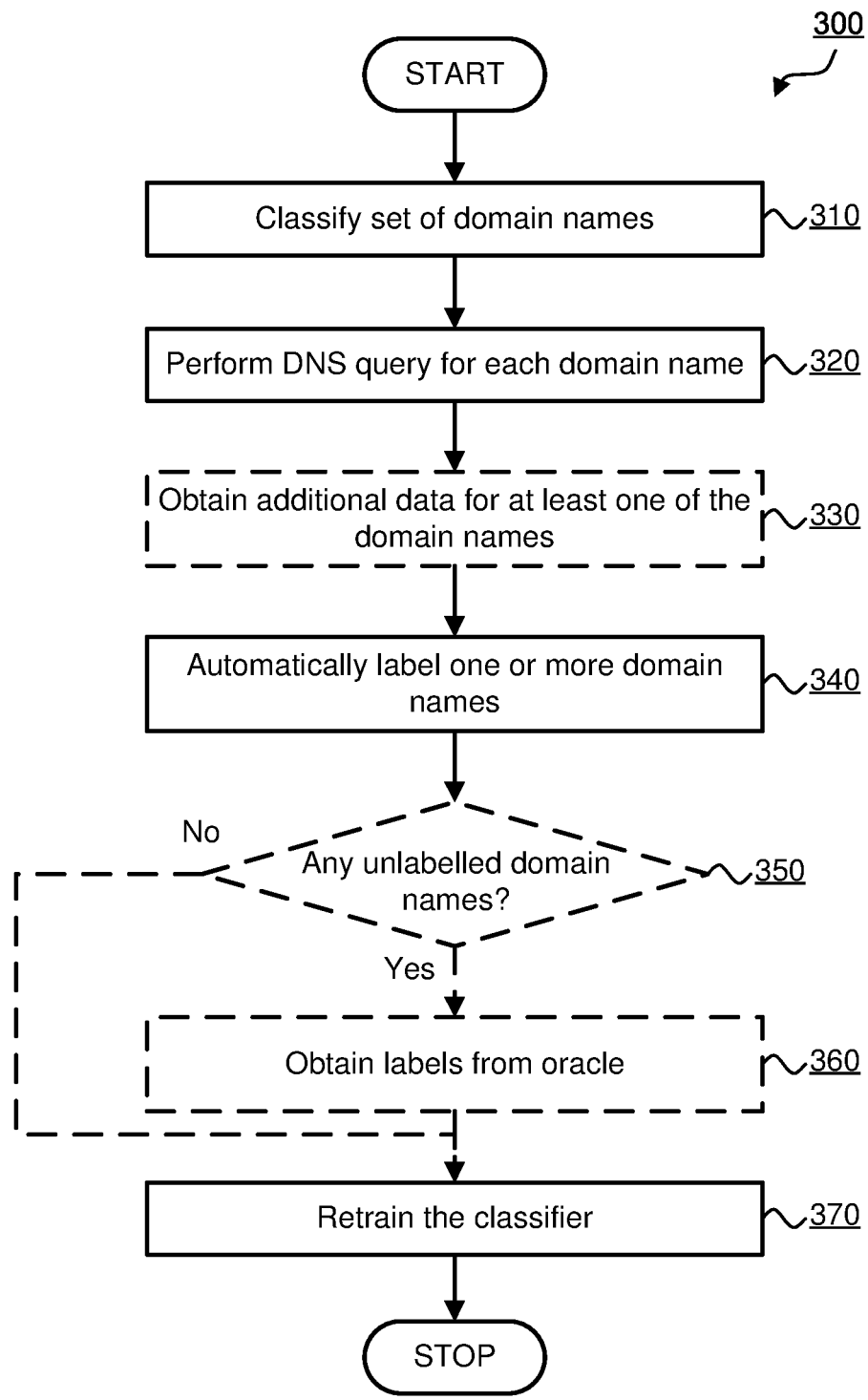
FIG. 3 is a flowchart illustrating a method for retraining a classifier using active learning that is performed as part of the method illustrated by FIG. 2.

At operation 220, the method 200 uses an active learning technique to retrain the classifier so as to improve its accuracy. There are a number of sub-operations that are performed as part of operation 220, which collectively provide a method 300 performed by operation 220 to retrain the classifier using active learning. Operation 220 will now be discussed in more detail with reference to FIG. 3 which is a flowchart illustrating this method 300.

At an operation 310, the method 300 uses the classifier to classify a set of domain names. This set of domain names is unlabelled. That is to say, a correct label (i.e. "legitimate" or "illegitimate") is not known for the domain names in the set. A predicted label for each of the domain names in the set is generated by the classifier by providing each of the domain names in turn as an input to the classifier. Accordingly, the output from the classifier provides a prediction of either legitimate or illegitimate for each of the domain names in the set.

The set of domain names used by operation 310 may be generated using any appropriate technique. For example, the domain names that have been the subject of Domain Name Service (DNS) queries within a network may be collected and used as the set. In some cases, the set of domain names may be static. That is to say, it may be generated once and then reused for any subsequent iterations of method 300 (albeit with any subsequently labelled domain names being removed). Alternatively, in other cases, the set of domain names may be updated over time. For example, the domain names from more recent DNS queries may be periodically collected and added to the set of domain names.

The set of domain names that are classified during operation 310 (and used in the subsequent steps of the method 300) may be selected from a larger set of domain names. This selection may be based on the classifier's confidence in its prediction of the classification for each domain name in the larger set. In this case, operation 310 may be conceptually viewed as classifying all the domain names in the larger set of domain names and then selecting a subset of those domain names to be used in the remaining operations of the method 300. As an example, the method 300 may select a set of domain names of predetermined size from the larger set such that the selected set includes a predetermined number of domain names for which the classifier is most confident about its predicted classification. Alternatively, the set of domain names used by method 300 may only include those domain names from the larger set for which the classifier's confidence in its prediction is above a predetermined threshold. By selecting the set in such a way, it is expected that the accuracy of the automatic labelling performed by the subsequent operations in the method 300 can be improved.

In any case, having used the classifier to classify each of the domain names in the set at operation 310, the method 300 proceeds to an operation 320.

At an operation 320, the method 300 performs a respective domain name system (DNS) query for each domain name in the set of domain names. As will be appreciated by those skilled in the art, a DNS query can be used to resolve an IP address that is associated with a particular domain name (or subdomain). There are a variety of responses that may be received in response to a DNS query. If the DNS query is successful, a "NOERROR" response may be received which includes an IP address for the domain name. However, if the domain name does not exist (e.g. it has not yet been registered), an "NXDOMAIN" response may be received instead. In this case, the DNS query may be considered to have been unsuccessful.

Although for simplicity this description refers to a "DNS query" in the singular sense, it will be appreciated that a single "DNS query" may in fact involve several queries to different DNS servers in turn (such as the root top-level domain (TLD) DNS, the TLD DNS for a specific TLD and the authoritative DNS for a particular domain) before a final response is determined.

In some cases, a response code other than "NOERROR" or "NXDOMAIN" may be received indicating that the DNS query failed for a reason other than the fact that the domain name does not exist (such as due to a server failure). In such cases, the DNS queries for such domain names may be considered to have been inconclusive and those domain names may be ignored during the remaining operations of method 300.

In any case, having obtained the outcomes of DNS queries for the set of domain names at operation 320, the method 300 proceeds to an optional operation 330 or, if optional operation 330 is not present, to an operation 340.

At optional operation 330 (as indicated by the dashed lines in FIG. 3), the method 300 obtains additional information for at least one domain name in the set of domain names.

This additional information about a domain name can be used in later operations to help automatically label domain names, as will be discussed further below. In some cases, additional information may be obtained for all the domain names in the set of domain names. In other cases, additional information may only be obtained for a particular subset of the domain names. That is to say, the additional information may, in some cases, only be needed to aid the classification of domain names in certain situations. For example, additional information may be obtained for each domain name in the set of domain names that was classified as legitimate and for which the DNS query succeeded to help further verify whether such domain names are in fact legitimate, as will be described further in relation to operation 340 below.

It will be appreciated that there are many potential sources for obtaining additional information about a domain name that could be used (for example, a WHOIS query may be used to obtain details about the registered owner of a domain name). However, it has been found that the Start of Authority (SoA) record included in a response to the DNS query can be particularly useful. In particular, it has been identified that domain names that are registered for use as a command and control server for malware (whether generated by a DGA or otherwise) tend not to include an SoA record (even though a DNS query may successfully resolve an IP address for such a domain). Accordingly, in some cases, the additional information obtained at operation 330 comprises an SoA record that is included in the response to the DNS query.

In any case, having obtained additional information for at least one of the domain names in the set of domain names at optional operation 330, the method proceeds to operation 340.

At operation 340, the method 300 automatically labels one or more domain names in the set of domain names. This is achieved by using the predicted classification of the domain names from the classifier that was obtained during operation 310 together with the outcome of the respective DNS queries for each of the domain names that was obtained during operation 320 to identify any domain names for which the correct label can be automatically inferred with a high degree of confidence.

One situation in which a label can be automatically inferred is where the classifier predicted an "illegitimate" classification for a domain name and the DNS query for that domain name failed (e.g. an "NXDOMAIN" response was received). Domain names for which this is true can be automatically labelled as being "illegitimate".

Another situation in which a label can be automatically inferred is where the classifier predicted a "legitimate" classification for a domain name and the DNS query for that domain name succeeded (e.g. a "NOERROR" response was received). Domain names for which this is true can be automatically labelled as being "legitimate".

As discussed earlier, DGA's typically produce a vast number of potential domain names that could be used as the location for a malware's command and control server. Meanwhile only a tiny proportion of these domain names will be registered for use by the attacker to deploy their command and control server to. The large number of other domain names that are generated will remain unused by the attacker (and probably, on the whole, will not have been registered by anyone else). Therefore, DNS queries for these domain names will likely produce an "NXDOMAIN" response. By contrast, the proportion of failed DNS queries for domain names used by regular (non-malware) traffic tends to be quite low.

Where a DNS query is issued to the correct DGA-generated domain name for a malware's command and control server (i.e. one to which the command and control server has actually been deployed), the DNS query will be successful. Accordingly, it may not be possible to automatically label such domain names based solely on the aforementioned criteria. In some cases, such domain names may therefore remain unlabelled. Nonetheless, through the use of automatic labelling to identify the vast majority of DGA-generated domain names, the characteristics of the DGAs currently in use are likely to be learnt by the classifier, allowing the small number of domain names that could not be automatically labelled (e.g. those to which a command and control server is actually deployed) to be correctly classified regardless.

In some cases, where additional information was obtained for a domain name during optional operation 330, this additional information may be used to verify (or modify) the automatic labelling of that domain name in the above-mentioned situations. In particular, this additional information may be useful in verifying the automatic labelling of a domain name as being "legitimate" (i.e. those domains which the classifier predicted as being "legitimate" and for which the DNS query succeeded). In such cases, the additional information can be used to identify characteristics of illegitimate domains that have actually been registered for use by an attacker (and therefore provide a successful response to a DNS query). For example, it has been identified that domains registered by attackers for this use tend to have an empty Start of Authority (SoA) record which is uncommon amongst domain names that have been registered for legitimate use. Accordingly, in such cases, any domain names which the classifier mis-predicted as being "legitimate" and for which the DNS query succeeded may nonetheless be labelled as being "illegitimate" (or alternatively may be left unlabelled or sent to an oracle for labelling) if the SoA record included in the DNS response for that domain was empty (or is otherwise not present).

In any case, having automatically labelled one or more domain names at operation 340, the method 300 may proceed to an optional operation 350. Otherwise, if optional operation 350 is not present, the method proceeds to an operation 370.

At an optional operation 350, the method 300 determines whether an oracle should be consulted to obtain labels for at least some of the domain names that could not be automatically labelled by operation 350. In particular, an oracle may be consulted to provide labels for any domains names in the set that were classified as "legitimate" but for which the DNS query failed or that were classified as "illegitimate" but for which the DNS query succeeded. If it is determined that an oracle should be consulted to obtain labels for at least some of the domain names, the method 300 proceeds to an operation 360. Otherwise, the method 300 proceeds to operation 370.

At operation 360, the method 300 consults an oracle to obtain labels for at least some of the domain names that could not be automatically labelled by operation 350. In some cases, the oracle may be a security analyst. Accordingly, at operation 360, the method provides the domain names that need labelling to the oracle and receives a label (i.e. "legitimate" or "illegitimate") back from the oracle. The operation 360 may also provide contextual information to the oracle to assist in the labelling of each domain name. For example, the operation 360 may provide the predicted classification of each domain name (possibly together with an indication of the classifier's confidence in that prediction). Additionally the response to the DNS query that was performed at operation 320 may also be provided. The operation 360 may also gather information from other sources to assist the oracle in determining a label for these domain names.

Having labelled at least some of the domain names that could not be automatically labelled by consulting an oracle at operation 360, the method 300 proceeds to operation 370.

At operation 370, the method 300 uses the newly labelled domain names to retrain the classifier. That is to say, the domain names that were labelled at operation 340 (and optionally at operation 360) are added to a corpus of labelled training data that is used to re-train the model. Accordingly, in addition to the newly labelled domain names, the training data may also include labelled domain names obtained during previous iterations of method 300 (i.e. iterations of operation 220 of method 200) as well as any initial training data that had been obtained to initially train the classifier at operation 210 of method 200.

Having retrained the classifier at operation 370, the method 300 ends and method 200 resumes by proceeding to an operation 230.

At operation 230, the method 200 uses the classifier to classify a domain name that is the subject of a DNS query from a computer system in a network. In some cases, the method 200 may be performed by the computer system (e.g. as part of anti-malware software that is installed on the computer), in which case the method 200 may be solely concerned with analysing DNS queries made by that particular computer system. In other cases, the method 200 may be performed by a separate computer system operating within the network (e.g. as part of an intrusion detection system or intrusion prevention system), in which case the method 200 may analyse DNS queries made from a plurality of computer systems within the network. Either way, a DNS query from a networked computer system is analysed to determine a domain name that is being queried and that domain name is provided as an input to the classifier. The classifier then provides a classification of either "legitimate" or "illegitimate" for the domain name.

Having classified the domain name at operation 230, the method 200 proceeds to an operation 240.

At operation 240, the method 200 uses the classification from the classifier to determine whether the domain name is legitimate. If the domain name that was queried by the computer system is determined to be illegitimate (i.e. if it was classified as "illegitimate" by the classifier at operation 230), the method proceeds to an operation 250. Otherwise, the method proceeds to an operation 260.

At operation 250, the method 200 takes one or more predetermined actions for mitigating or preventing the activity of malware. In particular, given the classification of a domain name as "illegitimate" at operation 240, it is likely that that the computer system is affected by a malware that is attempting to use that domain name as a possible location for its command and control server. Accordingly, there are a range of possible actions that could be taken in respect of the computer system that issued the DNS query (which is likely to be affected by malware) or the domain name (which is likely to be a DGA-generated domain name used by malware), or both, to counter the malware's activity. For example, the predetermined actions could include causing a malware scan to be performed in respect of the computer system and/or otherwise increasing a level of monitoring that is performed in respect of that computer system to detect any other signs that the computer system has been subverted by malware. Similarly, the predetermined actions could include preventing communication with the domain name, either by the individual computer system that issued the DNS query or network-wide. Equally, the predetermined actions may include flagging the domain name for review or otherwise logging the access to the domain name to allow malware patterns to be analysed over time. Of course, it will be appreciated that any other suitable predetermined actions for countering the malware may be used in addition or instead.

Having taken one or more predetermined actions to counter the malware at operation 250, the method 200 proceeds to operation 260.

At operation 260, the method 200 determines whether the method 200 should be repeated. That is to say, whether there are further DNS queries to be analysed. If so, the method performs a further iteration of operations 230, 240, 250 and 260 in relation to those further DNS queries. Otherwise the method 200 ends.

Although not illustrated in FIGS. 2, the classifier may be re-trained iteratively. That is to say operation 220 may be performed periodically or sporadically to obtain new labelled training data and re-train the classifier using the method 300 as described above. In some cases, the iterative re-training may be performed in parallel to the use of the classifier in a network to protect against malware (through the performance of operations 230, 240 and 250). In some cases, the live DNS queries that are made (that is the DNS queries against which operations 230, 240 and 250 act) may also be used in the re-training of the classifier. For example, the live DNS queries may be used to generate the set of domain names used within the method 300 (or alternatively the larger set of domain names from which a subset is selected). Similarly, the responses to the live DNS queries may be recorded and reused by operation 320 of the method 300 thereby avoiding the need to explicitly perform a separate DNS query. Accordingly, the classifier may continue to learn and improve its performance even while it is being used.

As described above, the present invention can enable some domain names to be automatically labelled as part of an active learning technique for training a classifier to detect domain names that have been generated by a domain generating algorithm (DGA) for use by malware. Although active learning seeks to reduce the labelling load for training a classify by selecting the most useful samples in a training data set to be labelled, the subset of samples that is selected can still be very large. Therefore, by reducing the number of labels that need to be manually determined (through the automatic labelling of some of the samples), the present invention can significantly reduce the time and effort required to train a classifier to identify DGA-generated domain names used by malware.

An evaluation of the performance of the automatic labelling approach provided by an embodiment of this invention has been conducted. In this evaluation, domain names that were predicted to be "legitimate" and for which the DNS query was successful were automatically labelled as "legitimate", whilst domain names that were predicted to be "illegitimate" and for which the DNS query was unsuccessful were automatically labelled as "illegitimate". Any other domain names not meeting these criteria were not automatically labelled and were instead referred to an oracle for labelling.

This evaluation found that a very high labelling accuracy can be achieved through this automatic labelling technique. In particular, in these evaluations, the average accuracy of automatic labelling for both legitimate and non-legitimate domains was 98.3%, with the accuracy of automatically labelling legitimate domain names being slightly higher than the accuracy of automatically labelling illegitimate domain names. In other words, the error rate of automatic labelling in these evaluations turned out to be less than 1.7%. This level of error rate is acceptable for most, if not all, machine learning techniques, which will be able to successfully learn the patterns of domain names generated by DGAs despite the presence of such labelling errors (which are commonly present in training datasets regardless of how they are labelled).

Additionally, it was observed during this evaluation that an average of 62.42% of the domain names in the test set could be automatically labelled. Specifically, 78.13% of domain names predicted as "illegitimate" were automatically labelled, whilst 46.71% of domain names predicted as "legitimate" were automatically labelled. It is believed that a reason for the lower proportion of "legitimate" domain names that could be automatically labelled may be that a number of legitimate domain names failed a DNS lookup possibly due to the domain names in the test data set having been abandoned or de-registered since the test data set was created. It is therefore possible that the rate of automatic labelling for more current "legitimate" domain names could be higher.

Finally, it was also observed during this evaluation that the accuracy of the predictions produced by the classifier (which was trained using ten iterations of active learning) using this automatic labelling technique was almost identical to the accuracy produced by a classifier trained using an active learning technique (with the same number of iterations) in which the samples were exclusively manually labelled.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example. Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention. It will be understood by those skilled in the art that, although the present invention has been described in relation to the above described example embodiments, the invention is not limited thereto and that there are many possible variations and modifications which fall within the scope of the invention. The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method for protecting against malware, the method comprising:
   training a classifier to classify a domain name as being either legitimate or illegitimate, wherein a classification of illegitimate indicates that the domain name was generated by a Domain Generation Algorithm used to generate domain names for malware;
   retraining the classifier using an active learning technique by:
      using the classifier to determine a respective classification of each domain name in a set of domain names;
      performing a respective domain name system, DNS, query for each domain name in the set;
      labelling one or more domain names in the set based on the classification of those domain names and the outcome of the respective DNS queries for those domain names; and
      using training data comprising the labelled one or more domain names to retrain the classifier;
   using the classifier to classify a domain name that is the subject of a DNS query from a computer system in a network; and
   taking one or more predetermined actions for mitigating or preventing the activity of the malware in response to the domain name being classified as illegitimate.

2. The method of claim 1, wherein labelling the one or more domain names comprises labelling as legitimate each domain name in the set that was classified as legitimate and for which the DNS query succeeded.

3. The method of claim 1, wherein labelling the one or more domain names comprises labelling as illegitimate each domain name in the set that was classified as illegitimate and for which the DNS query failed.

4. The method of claim 1, wherein labelling the one or more domain names comprises:
   identifying any domain names in the set that were classified as legitimate and for which the DNS query failed; and
   obtaining a label for the identified domain names from an oracle.

5. The method of claim 1, wherein labelling the one or more domain names comprises:
   identifying any domain names in the set that were classified as illegitimate and for which the DNS query succeeded; and
   obtaining a label for the identified domain names from an oracle.

6. The method of claim 1, wherein labelling the one or more domain names comprises:
   obtaining additional information for at least one domain name in the set, wherein the labelling of the at least one domain name is further based on the additional information.

7. The method of claim 6, wherein additional information is obtained for each of the domain names in the set that were classified as legitimate and for which the DNS query succeeded.

8. The method of claim 6, wherein the additional information comprises a Start of Authority, SOA, record included in a response to the DNS query.

9. The method of claim 8, comprising labelling a domain name as illegitimate in response to the SOA record for that domain name being empty.

10. The method of claim 1, wherein the method is performed by the computer system.

11. The method of claim 1, wherein the method is performed within the network.

12. The method of claim 1, wherein the one or more predetermined actions comprise one or more, or all, of:
   causing a malware scan to be performed in respect of the computer system;
   increasing a level of monitoring that is performed in respect of the computer system;
   preventing communication with the domain name;
   flagging the domain name for review; and
   logging the access to the domain name.

13. The method of claim 1, wherein the set of domain names are selected from a larger set of domain names.

14. A computer system comprising a processor and a memory storing computer program code for performing the steps of claim 1.

15. A non-transitory computer-readable medium storing a computer program which, when executed by one or more processors, is arranged to carry out a method according to claim 1.

* * * * *